Jan. 30, 1973  M. P. STRIER ET AL  3,713,890
FLEXIBLE BATTERY SEPARATOR AND METHOD OF PRODUCTION
Filed April 13, 1970
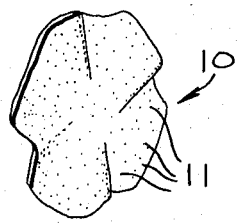
_Fig. 1_
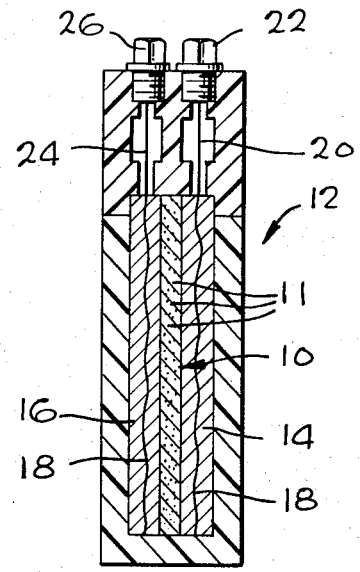
_Fig. 2_
_Fig. 3_
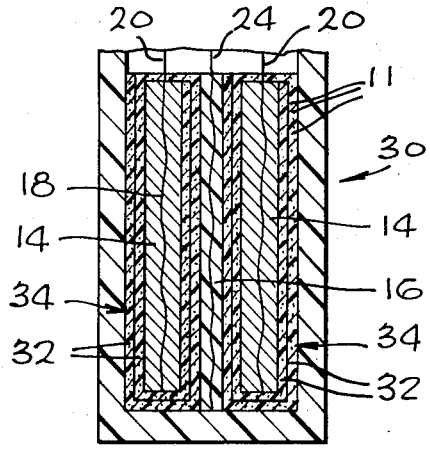
MURRAY P. STRIER
JOSEPH S. SMATKO
INVENTORS
BY Max Geldin
ATTORNEY

United States Patent Office 3,713,890
Patented Jan. 30, 1973

3,713,890
FLEXIBLE BATTERY SEPARATOR AND METHOD OF PRODUCTION
Murray P. Strier, Niagara Falls, N.Y., and Joseph S. Smatko, Santa Barbara, Calif., assignors to McDonnell Douglas Corporation, Santa Monica, Calif.
Continuation-in-part of application Ser. No. 6,409, Jan. 28, 1970. This application Apr. 13, 1970, Ser. No. 27,577
Int. Cl. H01m 3/02
U.S. Cl. 136—20                                    27 Claims

ABSTRACT OF THE DISCLOSURE

Method for producing an improved battery separator, in the form of a flexible microporous separator film containing particles of an inorganic substance in an organic binder, such separator having good ionic conductivity and good thermal and alkali resistance, by mixing an aqueous dispersion of a substance which is insoluble in water and in alkali and of fine particle size, e.g. zirconia, with an aqueous dispersion of a latex type polymer such as a fluorocarbon polymer, e.g. polytetrafluoroethylene, casting a film of such mixture, drying the film, sintering the dried film, and forming a film of said polymer with particles of such substance, e.g. zirconia, uniformly distributed in such film, and preferably including treating such sintered film with alkali, preferably aqueous KOH, to substantially increase the conductivity of such film. The resulting flexible separator film produced by such process.

This application is a continuation-in-part of our copending application Ser. No. 6,409, filed Jan. 28, 1970.

This invention relates to production of highly flexible microporous separator films comprising an organic polymer, particularly polytetrafluoroethylene, having a uniform distribution of particles of an inorganic substance, e.g. zirconia, designed especially for use in high energy density batteries. The invention especially concerns procedure for producing the above flexible microporous films having good to high ionic conductivity, good thermal stability and high resistance or inertness to alkali, and to the resulting separator film, and to batteries, especially high energy density batteries, embodying such improved microporous separator films.

Batteries are an important source of energy storage for power generation. An important type of battery particularly suited for such applications are the high energy density alkaline electrolyte cells such as the silver-zinc, zinc-air and nickel-zinc batteries. High energy density batteries are generally battery systems which have a substantially higher energy per unit of weight than conventional, e.g., lead, storage batteries. In addition to important air-borne applications, such high energy density batteries have many other applications, such as in portable tools and appliances, television, radio and record player, engine starting, portable X-ray units and the like.

In high energy density batteries such as silver-zinc batteries, the electrodes are placed adjacent opposite sides of a membrane or separator which performs the function of retaining electrolyte, separating the electrodes, and permitting transfer of electrolyte ions while inhibiting migration of electrode ions which short circuit the battery. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperatures.

In U.S. Pat. No. 3,364,077 to Arrance, et al. there is disclosed an improved battery separator comprising a fibrous inorganic material, particularly potassium titanate, combined with tetrafluoroethylene polymer, either in the form of such inorganic fibrous material, e.g. potassium titanate fibers, mixed with the tetrafluoroethylene polymer or wherein the separator comprises a membrane formed of fibrous inorganic material, e.g. fibrous potassium titanate, and a thin sheet of microporous tetrafluoroethylene polymer in contact with a surface of such membrane. Although the resulting separators have good resistance to chemical attack, and improved strength and flexibility, those separators which are produced according to this patent by mixing, e.g. potassium titanate fibers, with tetrafluoroethylene polymer in powder form, followed by bonding the mixture at high pressures and elevated temperatures, do not have high flexibility, and the combined inorganic material-tetrafluoroethylene polymer separators of such patent do not possess as high ionic conductivity as is desired for many applications wherein such separators are employed in high energy density batteries.

Flexible substantially inorganic separators are disclosed in U.S. application Ser. No. 676,224, filed Oct. 18, 1967, by C. Berger, et al., now abandoned, consisting essentially of a major portion of a porous inorganic material such as a sintered porous solid solution of magnesium silicate and iron silicate, and a minor portion of a water coagulable organic fluorocarbon polymer such as vinylidene fluoride polymer, the polymer bonding the particles of the inorganic material together and forming a flexible membrane. However, such membrane is cast from a mixture of the inorganic powder and a volatile solvent which dissolves the polymer such as dimethyl acetamide. However, polytetrafluoroethylene cannot be employed as a practical matter in the procedure of this application since it is generally not soluble in organic solvents, and the resulting separator of the above 676,224 application in certain instances does not have the desired high ionic conductivity particularly desirable for use of such separators in high energy density batteries.

Adlhart, et al. Pat. No. 3,453,149 discloses a thin flexible fuel cell electrolyte membrane formed by mixing together porous inorganic carrier particles, an aqueous polytetrafluoroethylene emulsion and acid electrolyte such as phosphoric acid, the mixture heated to coagulate and decompose the emulsion, and the resulting material shaped by being rolled or pressed into sheet form, the resulting product containing a free concentrated acid electrolyte entrapped therein. Such coagulated membrane is relatively weak and is not a battery separator, and could not function and would be inoperable as a separator in a high energy density battery employing alkaline electrolyte. Also, the inorganic phase is converted in the presence of acid to a salt such as zirconium phosphate and functions as an electrolytically conductive compound. In Adlheart treatment of an inorganic oxide such as zirconium oxide with an acid such as phosphoric acid results in production of an electrolytically conductive material.

The above Arrance, et al. Pat. 3,364,077 in the paragraph bridging columns 7 and 8 of such patent, notes the Hamlen article of 1962 directed to a fuel cell membrane formed by compressing a mixture of zirconium phosphate and powdered Teflon, very similar to the Adlhart fuel cell membrane. However, the article points out that the Teflon binder in this case decreased the electrical conductivity of the membrane substantially and the Arrance, et al. patent states that such membrane is not suitable as a battery separator.

In our obove copending application, an electrode material-binder combination particularly in the form of a zinc oxide-polytetrafluoroethylene film is produced by employing aqueous dispersion or aqueous emulsion technology based on the mixing of a fluorocarbon, e.g. polytetrafluoroethylene, emulsion with an active electrode material such as a zinc oxide, suspension, to obtain fine dispersion of the active electrode material, such as zinc oxide, substantially uniformly throughout the polymer binder or matrix, and the resulting aqueous dispersion is cast to produce a film, such film dried, sintered and finally rolled to provide a fibrous binder structure, e.g. a polytetrafluoroethylene film, containing particles of the active electrode material, e.g. zinc oxide distributed therein.

The present invention takes advantage of the use of the above described aqueous dispersion technology of our copending application to produce however, improved highly flexible cast microporous battery separators or films having high ionic conductivity and correspondingly low resistivity of the order of about 5 to about 15 ohm-cm., which are highly effective when employed in high energy density batteries and have good alkali resistance.

Thus, the process of the present invention for preparing microporous flexible inorganic substance-organic polymer binder separator films having uniformly distributed pores, comprises forming an aqueous mixture of (a) particles of an inorganic substance, such substance being insoluble in water and insoluble in alkali, and having substantially no electronic conductivity, and having a fine particle size, and (b) particles of a water dispersible latex type alkali-stable organic polymer, such substance being incapable of precipitating or coagulating said polymer from aqueous dispersion, casting a film of said mixture, drying said film, and sintering the dried film at temperature at which substantially no decomposition of said polymer occurs, and forming a flexible film of said polymer with said particles of said substance bonded by and uniformly distributed in said polymer.

A feature of the present invention is the treatment of the above sintered microporous flexible film with alkali, preferably with aqueous KOH, which substantially increases the ionic conductivity of the film, substantially without dissolving any of the particles of inorganic substance. As will be pointed out in greater detail hereinafter, pretreatment of the film, e.g. in acetone and/or methanolic alkali, prior to treatment with aqueous alkali, facilitates penetration of the film by the subsequent aqueous alkali treatment, to obtain such increased conductivity. Such alkali treatment is directly contrary to the treatment of the film with acid electrolyte as in the above Pat. 3,453,149, and results in an entirely different product, that is a battery separator of high ionic conductivity in contrast to the fuel cell electrolyte membrane of the patent.

Any inorganic substance in particulate form can be employed for incorporation into the organic polymeric binder according to the invention, which is insoluble in water and also insoluble in alkali, and which does not precipitate or coagulate the polymeric binder, e.g. polytetrafluoroethylene, from aqueous dispersion, and which has a sufficiently fine particle size, preferably not greater than about 10μ, to permit uniform distribution of the inorganic particles throughout the film of polymeric binder matrix. Thus, there can be employed inorganic substances such as zirconia (intended to include pure zirconia, and also calcia stabilized zirconia which may contain from about 4 to about 15% CaO and yttria stabilized zirconia containing from about 1 to about 30% yttria), olivine (natural mineral containing magnesium silicate and iron silicate), cerium oxide, thorium oxide, titanates and zirconates such as potassium, calcium, barium and strontium titanates and zirconates, particularly potassium titanate, aluminosilicates including alkali metal, e.g. sodium and potassium, and the alkaline earth, e.g. magnesium, calcium and barium, aluminosilicates, forsterite (magnesium silicate), spinels such as magnesium aluminate, alumina, and the like, and mixtures of such inorganic substances. Preferred inorganic materials are zirconia in the form of pure zirconia, calcia stabilized zirconia or yttria stabilized zirconia, and olvine. All of the above examples of inorganic substances have substantially no electronic conductivity, that is, are in a class of substances generally recognized as being electrical insulators.

The organic polymeric materials incorporated with the above inorganic substances according to the invention for production of an improved separator, may include any latex type polymer or elastomer, which is resistant to alkali, and which preferably has high temperature resistance. Included among suitable polymers for this purpose are fluorocarbon polymers, such as vinylidene fluoride polymers and copolymers, e.g. vinylidene fluoride polymer (marketed as Kynar), copolymers of hexafluoropropylene and vinylidene fluoride (marketed as Viton), trifluorochloroethylene polymer (KEL–F), polytetrafluoroethylene (Teflon), fluoroinated ethylene-propylene copolymer (FEP), polyphenylene oxide, polysulfone, polyethylene, polypropylene, rubber polymers such as neoprene rubber, synthetic polyisoprene, acrylonitrile-butadiene-styrene (ABS), butadiene-acrylonitrile copolymer (Hycar) and natural rubber, acrylic polymers such as acrylate and methacrylate polymers, vinyl polymers such as polyvinyl chloride and vinyl chloride-vinyl acetate copolymers, and the like, and mixtures of such polymers. The preferred polymers are the fluorocarbons, particularly polytetrafluoroethylene, which has high temperature resistance and good resistance to alkali, and which is commercially available as an aqueous dispersion or emulsion.

In preferred practice, an aqueous dispersion or suspension of the inorganic substance, such as an aqueous suspension of zirconia or calcia stabilized zirconia is provided, such suspension preferably having a consistency comparable to heavy cream, and an aqueous emulsion or dispersion of the organic polymer or binder, e.g. an aqueous emulsion of polytetrafluoroethylene, is added to the aqueous dispersion of the inorganic substance, to form an aqueous homogeneous mixture or dispersion of the inorganic substance particles and the organic polymer particles. For this purpose it is preferred to employ relatively small particle size particulate inorganic substance such as zirconia and particulate polymeric material such as polytetrafluoroethylene. Thus, in preferred practice the particle size of the inorganic substance such as zirconia can range from about 0.1 to about 10μ and the particle size of the organic polymer or polymeric binder material such as polytetrafluoroethylene, preferably ranges from about 0.01 to about 10μ. If larger particles of inorganic substance than 10μ are employed, and the resulting composite film employed as a separator in a high energy density battery such as a silver-zinc or nickel-zinc battery, it has been found that zinc dendrites penetrate the separator at an earlier time, thereby shortening the life of the battery.

The solids concentration in the resulting aqueous slurry, including inorganic substance and polymer or resin binder, can vary substantially, and can range for example from about 10 to about 75% solids. The proportion of inorganic substance such as zirconia to binder, e.g. fluorocarbon polymer, employed is such that the mixture contains usually a major proportion of inorganic substance such as zirconia and a minor proportion of the polymeric binder material, so as to result in a separator film produced according to the invention having a substantial concentration of the inorganic substance, e.g.

zirconia. Generally, the mixture or slurry contains about 50% to about 95% inorganic substance such as zirconia and about 5% to about 50% polymer, by weight of total solids, preferably about 70% to about 90% inorganic substance and about 10% to about 30% polymer. A particularly successful mixture found according to the invention contains about 70% inorganic substance such as zirconia and about 30% of polymeric material, e.g. fluorocarbon polymer such as polytetrafluoroethylene.

Although in preferred practice an aqueous dispersion or suspension of the inorganic substance such as zirconia and the polymer material such as polytetrafluoroethylene are separately provided and mixed. If desired, zirconia particles can be incorporated in an aqueous dispersion of the polymer binder, employing a sufficient amount of water to maintain both the inorganic substance and the polymer in fine dispersion, particularly in the concentrations of these materials noted above. Also, a thick highly concentrated aqueous mixture of inorganic substance such as zirconia can be produced and the aqueous dispersion of polymer material added to it.

The homogeneous slurry or mixture of inorganic substance such as zirconia and polymer such as polytetrafluoroethylene is cast on a suitable preferably flat surface, e.g. a glass plate, as by pouring the slurry or mixture onto such plate employing suitable means such as a casting knife or doctor blade to obtain a desired thickness of film. However, any suitable casting procedure can be employed.

As an alternative, an aqueous paste of inorganic substance such as zirconia can be blended with the aqueous polymer emulsion, and the resulting mixture in the form of a paste can be extruded in the form of a film.

Hence, the term "cast" or "casting" employed in the specification and claims is intended also to include the above noted extrusion procedure.

The resulting film is then dried either at ambient temperature or at elevated temperature, and at elevated temperatures of say about 40 to about 100° C. such drying generally is carried out for a period of from about 2 to about 24 hours.

The resulting dried film of inorganic substance-polymer matrix is then subjected to sintering at a temperature which does not cause decomposition of the polymer binder, but which functions to soften the polymer and to cause interparticle bonding or welding of the polymer or resin matrix to form continuous chains. Sintering temperatures, depending upon the particular inorganic material and the particular polymer binder employed generally range from as low as about 100° C., or even lower, to about 375° C., and when employing fluorocarbons such as polytetrafluoroethylene, sintering temperatures can range from about 260 to about 375° C. Usually, such sintering is carried out for a period of from about 10 minutes up to about 2 hours.

Following cooling of the resulting sintered film, and as an optional feature a significant increase in film strength can be achieved by subjecting the film to rolling, that is the application of a roll, such as a cylinder or cylindrical rod, over the surface of the film. The advantage of such rolling is that it fully develops a fibrous or fibrillar structure in the polymer, e.g. polytetrafluoroethylene, binder or film, binding the inorganic particles, resulting in a strengthened film structure. The rolling can be carried out once or several times over the sintered film, in various directions, for example the film, e.g. a sintered zinc oxide-polytetrafluoroethylene composite film, can be subjected to application of a roll or cylindrical rod at least four times both in longitudinal and transverse directions. Thus, for example, a 1½ to 2" diameter stainless steel rod 6" in length can be used to roll a film containing a 25- to 50-gram quantity of sintered zirconia-polytetrafluoroethylene mixture.

Alternatively, such rolling can be carried out by working the film mass on a rubber mill, preferably heated, the rolls in the rubber mill, especially if set at different speeds, creating the necessary forces to stretch the binder into fibrillar or fibrous forms. Thus, a roll speed differential of 1:1 to 3:1 between the rolls can be employed.

Although the above noted rolling can be carried out at ambient or room temperature, in preferred practice the film is maintained at elevated temperature up to about 300° C., e.g. of the order of about 200 to about 300° C. with the roller preferably heated to the same temperature. The rolling procedure can take place over a period of from about 1 to about 10 minutes, the period of rolling depending upon the amount of sheer stress applied and the amount of heat, if any, which is used during the rolling procedure.

It is noted that if a rubber such as neoprene is employed and such rubber is cured (vulcanized), rolling has no advantage, but when uncured rubbers are employed, the strength of the film is improved by rolling.

The resulting sintered film, either with or without rolling has particles of the substance such as zirconia uniformly dispersed or distributed throughout the polymer, e.g. polytetrafluoroethylene, matrix or structure. In order to obtain films of increased thickness, following sintering of the film on the casting surface, e.g. glass plate, a second layer of slurry of particles such as zirconia and binder such as polytetrafluoroethylene is drawn down over the first film in the same manner as the first film. Once again, the above noted drying and sintering is carried out for the second film as in the case of the initial film. Finally, three-layer films can be prepared, if desired, by casting a third film layer over the second, followed by drying and sintering.

As a feature of the invention it has been found that treatment of the sintered film prior to aqueous alkali treatment according to the invention, with a ketone, particularly acetone, and with an alcohol, particularly methanol, functions to pre-wet the interface between the polymer, e.g. polytetrafluoroethylene, matrix film and the particles of filler substance, e.g. zirconia, to hasten penetration subsequently of the aqueous alkali solution into the interstices and interface of the polymer-inorganic particles, e.g. polytetrafluoroethylene-zirconia structure. If treatment with a ketone such as acetone and an alcohol such as methanol are not employed, then extended periods of treatment are required in aqueous alkali, e.g. KOH or NaOH, even at elevated temperatures up to 100° C. to penetrate into the film and to increase conductivity according to the invention.

Subsequent treatment by aqueous alkali is also facilitated by prior treatment of the film following the above noted treatment with for example acetone and methanol, with alcoholic alkali which further facilitates the admission and penetration of the aqueous alkali into the interface between the polymer binder, e.g. polytetrafluoroethylene, and filler, e.g. zirconia particles.

Thus, according to preferred treatment, the sintered film containing the uniformly dispersed inorganic particles such as zirconia is treated first with a ketone such as acetone, or methyl-ethyl ketone, then with an alcohol such as methanol, ethanol or isopropanol, then with alcoholic KOH, particularly methanolic KOH, and finally with an aqueous solution of alkali, e.g. KOH.

However, it is understood that although pretreatment with one or more of the above noted ketone alcohol, or alcoholic alkali solutions is preferred, any one or more, or all of the pre-treatment steps can be omitted and the sintered film containing the inorganic particles, e.g. zirconia, can be directly treated with aqueous alkali either at ambient or elevated temperature up to 100° C., to increase the conductivity of the microporous organic binder-inorganic, e.g. polytetrafluoroethylene-zirconia, composite film, according to the invention.

The sintered binder, e.g. polytetrafluoroethylene, film containing the inorganic substance such as zirconia can be treated or soaked for varying intervals of time with one or more of the above noted pre-treating solutions, for example for a period of as little as about 10 seconds to about 30 minutes usually about 1 to about 30 minutes, in each of the ketone, alcohol and alcoholic alkali solutions, depending upon the particular treating solutions employed, temperature of treatment, and degree of agitation of the solutions, and whether using continuous or batch operation.

An important feature of the invention resides in treatment of the sintered film in alkali, preferably in aqueous alkali, such as aqueous KOH or aqueous NaOH solution, e.g. 30 to 40% aqueous solutions of such alkalies, although the strength of such aqueous alkali solutions can be below 30% or above 40% alkali concentration. Such treatment creates microporous regions for ionic conduction both at the interface between the inorganic, e.g. zirconia, particles and binder, e.g. polytetrafluoroethylene, as well as between the inorganic, e.g. zirconia, particles. Since the inorganic substance, e.g. zirconia, is essentially insoluble in the aqueous alkali solution, the particles of such inorganic substance remain uniformly distributed in the organic binder or matrix film following alkali treatment.

The sintered polymer binder-inorganic particles film, e.g. polytetrafluoroethylene-zirconia film, has relatively good conductivity prior to treatment with aqueous alkali, and for example can have a conductivity measured in terms of resistivity of the order of about 25 to 100 ohm-cm. However, following treatment of such sintered film in aqueous alkali, e.g. aqueous KOH according to the invention, ionic conductivity is substantially increased, resulting in a corresponding substantially reduced resistivity of the so-treated film generally in the range from about 5 to about 20 ohm-cm. Thus, for example, the resistivity of a single layer polytetrafluoroethylene film having calcia stabilized zirconia particles homogeneously distributed therein has a resistivity following sintering and prior to treatment with alkali of about 75 ohm-cm., and following treatment with alkali has a resistivity of only 15 ohm-cm.

The sintered polymeric binder-inorganic particles film both before treatment with alkali and also following alkali treatment is such that it can be readily folded without cracking and is highly flexible. The film thicknesses of the final microporous film can range from about 0.2 to about 50 mils, usually from about 0.5 to about 20 mils, the increased film thicknesses being provided as pointed out above by casting, drying and sintering successive layers of film containing a filler or inorganic substance from the slurry or aqueous suspension of the filler substance such as zirconia and polymer such as polytetrafluoroethylene. Of particular significance, the resulting microporous polymer-inorganic film, e.g. polytetrafluoroethylene-zirconia film, has a highly uniform distribution of particles of the inorganic filler substance, e.g. zirconia particles, both before and after alkali treatment.

The pore size of the flexible film produced according to the invention whether before or after treatment with aqueous alkali, is very fine, ranging from about 0.01 to about $3\mu$, usually below $1\mu$, and such films of fine pore size are particularly adapted for use as a separator in high energy density batteries such as silver-zinc, nickel-zinc, zinc-air, silver-cadmium and nickel-cadmium batteries. The films produced according to the invention have a porosity ranging from about 25% to about 90%.

It is particularly noteworthy that the microporous flexible films produced according to the invention process are of substantially smaller pore size than the composite separator of the above noted Arrance, et al. patent.

Although the invention process results in the production of microporous films which are readily wetted by alkali electrolyte to yield highly conductive battery separators, the inorganic particles employed such as zirconia which is insoluble in the alkali, and the polymeric, e.g. the polytetrafluoroethylene, film matrix thus produced retains its inertness to alkali, and the composite film has high resistance to oxidation and good thermal stability, and although highly flexible has good strength, and particularly increased strength where the above mentioned rolling procedure is also employed.

As an alternative mode of alkali treatment, the sintered film containing the particles of inorganic substance, e.g. zirconia particles, with or without prior treatment with ketone, alcohol and/or alcoholic alkali, can be directly incorporated into a battery, e.g. a high energy density battery employing an aqueous alkali electrolyte, such as 30–40% aqueous KOH, and the aqueous alkali contained therein will function after a period of time to permeate and penetrate the film, and to thereby substantially increase its conductivity according to the invention.

The invention will be more clearly understood by reference to the description below of certain embodiments of the invention taken in connection with the accompanying drawings wherein:

FIG. 1 illustrates a flexible microporous polytetrafluoroethylene-zirconia particles composite flexible film produced according to the invention;

FIG. 2 shows assembly of the flexible film of FIG. 1 as a separator in a single cell battery according to the invention; and FIG. 3 illustrates a three plate battery employing a flexible composite film according to the invention, as separators.

The drawings are exaggerated for greater clarity.

The following are examples of practice of the invention.

EXAMPLE 1

Calcia stabilized zirconia, that is a composition containing 96% zirconia and 4% calcia (CaO) is ball-milled to produce particles of such inorganic material having a particle size range of from about 1 to less than $0.1\mu$, the average particle size being about $0.47\mu$. An amount of 335 grams of such fine particle size calcia stabilized zirconia is suspended in 225 grams water to form a 60% suspension by weight. An amount of 237.4 grams of Du Pont T-30B TFE aqueous emulsion of polytetrafluoroethylene (60.4% solids content) is added slowly to the zirconia dispersion.

After about 20 to 30 minutes of stirring, the resulting homogeneous slurry or aqueous dispersion of calcia stabilized zirconia and polytetrafluoroethylene is poured on a Pyrex glass plate, and is drawn down by means of a doctor blade set at 0.038 cm. (15 mils). The resulting film is dried initially for about 15 minutes in the draft of a laboratory hood at about 70° F., and further dried at ambient room temperature for 15 hours. The dried film is then sintered at 360° C. for 20 minutes. About 12 grams of glycerine is added to the slurry prior to casting, per 100 ml. of such mixture, to improve film properties and prevent cracking during the following sintering operation.

The resulting sintered film formed of about 70% calcia stabilized zirconia and about 30% polytetrafluoroethylene, is highly flexible, has uniform distribution of the zirconia particles, and has good stability in aqueous KOH solution at 50 to 100° C. The film has a thickness of about 2 mils, an average pore size of about $0.25\mu$, and a resistivity of 75 ohm-cm.

EXAMPLE 2

The sintered film produced in Example 1, following cooling and removal from the glass plate, is soaked in acetone for 5 minutes. Next, the film is soaked in methanol for 5 minutes. Next the film is soaked in saturated methanolic KOH for about 20 minutes. Finally, the film is soaked in 30% aqueous KOH solution. Treatment in the latter solution is carried out for about ⅓ hour. All of the above treatments in acetone, methanol, methanol-KOH and aqueous KOH solution are carried out at ambient (room) temperature.

The resulting microporous polytetrafluoroethylene-calcia stabilized zirconia composite film is off white in color, highly flexible, as indicated at 10 in FIG. 1 of the drawing, has good strength and has a uniform distribution of the calcia stabilized particles therein, as illustrated at 11, and has a highly uniform distribution of very fine pores having an average pore diameter of the order of about 0.25µ, and has high stability in 30–45% KOH at 50 to 100° C. The film has a thickness of about 2 mils.

The resulting flexible composite film after treatment in the above solutions, including final treatment in aqueous KOH, has a resistivity of 15 ohm-cm., as compared to the resistivity of 75 ohm-cm. for the sintered film of Example 1, which is not subjected to alkali treatment.

The resulting flexible composite film at 10 in FIG. 1, produced according to the present example, is assembled in a battery 12 illustrated in FIG. 2, together with zinc and silver electrodes 14 and 16, respectively, the flexible separator 10 being disposed between the electrodes and in contact with the adjacent surfaces thereof.

Each of the electrodes 14 and 16 has a collector grid 18 therein, the collector grid of the zinc electrode 14 being connected by lead wire 20 to a terminal 22, and the collector grid 18 of the silver electrode 16 being connected by a lead 24 to a terminal 26 on the battery. A 30% potassium hydroxide solution is employed as electrolyte in the battery.

The battery operates successfully both at 25° C. and at 100° C. as a secondary silver-zinc battery over a large number of charge-discharge cycles.

EXAMPLE 3

The procedure of Example 2 is followed, except that after sintering and prior to treatment in the acetone solution, the sintered film is cooled to about 220° C. and rolled using a stainless steel rod 1½" diameter by rolling the rod over the sintered zirconia-polytetrafluoroethylene composite film 10 times both in the longitudinal and transverse directions. Such rolling is carried out for a period of about 10 minutes.

Following rolling, the film is cooled and removed from the plate and then is subjected to treatment in the acetone, methanol, methanolic KOH and finally aqueous KOH solutions, as described in Example 2.

The resulting flexible microporous composite polytetrafluoroethylene-zirconia film has substantially the same properties as the film produced in Example 2, except that as result of the rolling procedure in the present example, the resulting film has a fibrillar structure and has significantly higher strength of the order of about twice that of the correspondnig flexible composite film of Example 2.

EXAMPLE 4

The procedure of Example 2 is repeated except that a suspension in 80 grams water of 112 grams of the calcia stabilized zirconia, and 46 grams T–30B aqueous polytetrafluoroethylene emulsion is employed, the weight proportion of calcia stabilized zirconia particles to polytetrafluoroethylene being about 80:20. The film is cast, adjusting the doctor blade so that the resulting composite flexible has a thickness of about 4.5 mils. The film, following treatment with aqueous KOH as described in Example 2, has an off-white color, good strength and flexibility, and good resistance in aqueous alkali, and has properties including pore diameter and porosity similar to the film of Example 2.

The flexible composite film of the present example following sintering and prior to treatment in acetone and subsequent solutions, has a resistivity of 40 ohm-cm., representing good ionic conductivity. However, following treatment in the acetone, methanol, methanolic KOH and aqueous KOH solutions, such resistivity is substantially reduced to only 7.5 ohm-cm., and thus has very high ionic conductivity.

EXAMPLE 5

The procedure of Example 2 is repeated to produce a flexible composite film having a weight proportion of calcia stabilized zirconia to polytetrafluoroethylene of about 70:30.

However, after sintering and cooling of the composite film containing the zirconia particles, the film is removed from the glass plate, turned over and smoothed over the glass plate. A second layer of the aqueous mixture of zirconia particles and polytetrafluoroethylene particles is drawn down over the first film layer in the same manner as the first layer described in Example 1. Drying and sintering of the second layer of film is then carried out in the same manner as the first layer. Finally, a third layer of the slurry of zirconia and polytetrafluoroethylene particles is cast directly over the second layer and is dried and sintered in the same manner as the first two layers. During casting of each of the respective layers of film, the doctor blade is adjusted to obtain film thickness of about 1.5 mils, so that the three layer film has a total thickness of 4.5 mils.

The resulting three layer film is removed from the plate and is then subjected to treatment in the acetone, methanol, methanolic KOH and aqueous KOH solutions as in Example 2.

A silver-zinc battery indicated at 30 in FIG. 3 of the drawing, is assembled, containing two negative zinc electrodes 14 and one positive electrode 16. The three layer flexible sintered polytetrafluoroethylene film containing zirconia particles, produced as described above, and indicated at 32, is spirally wrapped twice around each zinc electrode 14 to form the flexible separator unit 34 having a total thickness of about 9 mils. 30% aqueous KOH is employed as electrolyte solution in the battery.

The resulting battery exhibits good electrical performance and operates successfully without shorting after a large number of charge-discharge cycles. The separator unit 34 employed has essentially the same high ionic conductivity of the order of about 10 to 15 ohm-cm. as the film produced according to Example 2.

EXAMPLE 6

The procedure of Example 2 is repeated, except that the film, following sintering, is soaked only in a 30% aqueous KOH solution at a temperature of about 100° C. for a period of about 3 hours.

The resulting microporous polytetrafluoroethylene film containing zirconia particles has substantially the same properties as the microporous film produced according to Example 2, but has a slightly lower ionic conductivity.

EXAMPLE 7

The procedure of Example 1 is repeated for producing the sintered composite flexible film of polytetrafluoroethylene containing calcia stabilized zirconia particles uniformly distributed in the polytetrafluoroethylene film.

Such film is then incorporated as a separator at 10 in the battery of FIG. 1, containing the zinc and silver electrodes 14 and 16, respectively, and 30% aqueous KOH is employed as electrolyte solution in the battery.

Upon addition of the aqueous electrolyte solution to the battery and after a period of about 3 hours of operation of the battery at 30° C., a substantial increase in ionic conductivity is observed from the performance characteristics of the battery, indicating the aqueous KOH electrolyte has penetrated and wetted the interstices between the polytetrafluoroethylene film and the zirconia particles contained therein according to the invention.

EXAMPLE 8

The procedure of Example 2 is followed except that a suspension of 80 grams of olivine having an average particle size of about 2µ in 72 grams of water, and 30 grams of T–30B aqueous polytetrafluoroethylene emulsion, are employed.

A microporous strong flexible polytetrafluoroethylene film containing olivine particles uniformly distributed therein in a ratio of 80 parts olivine and 20 parts polytetrafluoroethylene, by weight, and having similar properties to the film of Example 2, including high ionic conductivity, is produced.

EXAMPLE 9

The procedure of Example 2 is followed except that a suspension of 435 grams cerium oxide in 225 grams water, the particles of cerium oxide having an average diameter of about $0.6\mu$ is employed.

A microporous strong flexible polytetrafluoroethylene film containing the cerium oxide particles uniformly distributed therein in a ratio of 75.5 parts cerium oxide to 24.5 parts polytetrafluoroethylene, by weight, is produced, having properties similar to the flexible film of Example 2, including high ionic conductivity.

EXAMPLE 10

The procedure of Example 2 is repeated except employing in place of the aqueous emulsion of polytetrafluoroethylene an aqueous dispersion of polysulfone.

The resulting composite flexible zirconia-polysulfone film has properties similar to the zirconia-polytetrafluoroethylene film produced according to Example 2.

EXAMPLE 11

The procedure of Example 3 is repeated except employing in place of the aqueous emulsion of polytetrafluoroethylene an aqueous dispersion of Du Pont neoprene Latex No. 842–A of 50% solids content.

The resulting composite flexible zirconia-neoprene film has properties similar to the film produced in Example 3, the rolling increasing the strength of the film and also lowering resistivity to some extent.

EXAMPLE 12

The procedure of Example 8 is repeated except employing in place of the aqueous dispersion of polytetrafluoroethylene an aqueous dispersion of polysulfone or an aqueous dispersion of Du Pont neoprene Latex No. 842–A of 50% solids content.

The resulting composite flexible olivine-polymer binder films have properties similar to the olivine-polytetrafluoroethylene film produced according to Example 8.

As illustrated in FIGS. 2 and 3 of the drawing, it will be understood that one or a plurality of negative electrodes, such as zinc electrodes 14, and one or a plurality of positive, e.g. silver, electrode such as 16, with a microporous highly flexible separator having high ionic conductivity produced according to the invention, such as 10 or 34, between adjacent pairs of negative and positive electrodes, can be provided to form either single plate or multiplate batteries, having improved electrical performance.

From the foregoing, it is seen that the invention provides production of a novel, microporous flexible film composed of a polymeric binder having fine particles of an inorganic substance such as zirconia uniformly distributed therein, and particularly treated to have high ionic conductivity so that such film has particular advantage for use as a battery separator in a high energy density battery.

While we have described particular embodiments of the invention for purposes of illustration, it will be understood that various changes and modifications can be made therein within the spirit of the invention, and the invention accordingly is not to be taken as limited except by the scope of the appended claims.

We claim:

1. The process for preparing flexible microporous battery separator films consisting essentially of an inorganic substance and an organic binder, said films having good ionic conductivity, good thermal stability and resistance to alkali, which comprises forming an aqueous mixture of (a) particles of an inorganic substance, said substance being insoluble in water and insoluble in alkali, and having substantially no electronic conductivity, and having a fine particle size, and (b) particles of a water dispersible latex type alkali-stable organic polymer, said substance being incapable of precipitating or coagulating said polymer from aqueous dispersion, casting a film of said mixture, drying said film, sintering said dried film at temperature at which substantially no decomposition of said polymer occurs, and forming a flexible film of said polymer with said particles of said substance bonded by and uniformly distributed in said polymer, and treating said sintered film with alkali for a period sufficient to substantially increase the conductivity of said film substantially without dissolving any of said particles of said inorganic substance.

2. The process as defined in claim 1, including treating said sintered film with alcoholic alkali and then treating the resulting film with aqueous alkali to substantially increase the conductivity of said film, substantially without dissolving any of said particles of inorganic substance by said alcoholic alkali and aqueous alkali treatments.

3. The process as defined in claim 1, said particles of said inorganic substance having a particle size ranging from about $0.1\mu$ to about $10\mu$, and said organic polymer having a particle size ranging from about $0.01\mu$ to about $10\mu$.

4. The process as defined in claim 3, said particles of said inorganic substance being selected from the group consisting of zirconia, olivine, cerium oxide, thorium oxide, titanates, zirconates, aluminosilicates, magnesium silicate, magnesium aluminate, alumina and mixtures of said substances; and said latex-type polymer selected from the group consisting of fluorocarbon polymers, polyphenylene oxide, polysulfone, polyethylene, polypropylene, rubber polymers, acrylic polymers, vinyl polymers, and mixtures of said polymers.

5. The process as defined in claim 4, wherein said inorganic substance is zirconia, said zirconia being in the form of pure zirconia, calcia stabilized zirconia or yttria stabilized zirconia.

6. The process as defined in claim 4, wherein said particles of said inorganic substance is olivine.

7. The process as defined in claim 4, wherein said inorganic substance is zirconia, said zirconia being in the form of pure zirconia, calcia stabilized zirconia or yttria stabilized zirconia; and said polymer is polytetrafluoroethylene.

8. The process as defined in claim 4, wherein said inorganic substance is olivine and said polymer is polytetrafluoroethylene.

9. The process as defined in claim 4, which includes treating said sintered film first with acetone, then with methanol, then with methanolic KOH, and finally with an aqueous solution of KOH.

10. The process as defined in claim 7, which includes treating said sintered film first with acetone, then with methanol, then with methanolic KOH, and finally with an aqueous solution of KOH.

11. The process as defined in claim 4, including forming said mixture of particles of inorganic substance and said polymer by adding an aqueous emulsion of said polymer to an aqueous suspension of said particles of inorganic substance, said drying of said film being carried out at temperature of about 40 to about 100° C. for a period of from about 2 to about 24 hours, such sintering of said film being carried out at temperature of about 100 to about 375° C. for a period from about 10 minutes to about 2 hours.

12. The process as defined in claim 11, wherein said polymer is polytetrafluoroethylene.

13. The process as defined in claim 11, said inorganic substance being zirconia, said zirconia being in the form of pure zirconia, calcia stabilized zirconia or yttria stabilized zirconia, and said polymer being polytetrafluoroethylene, said sintering of said film being carried out at temperature ranging from about 260 to about 375° C., and including soaking said sintered film in acetone, then soaking said film in methanol, then soaking said film in methanolic KOH, and finally soaking said polytetrafluoroethylene film in aqueous KOH solution.

14. The process as defined in claim 1, including rolling said sintered film prior to treatment thereof with alkali, to form a fibrous film structure binding said particles of said substance.

15. The process as defined in claim 13, including rolling said sintered film prior to soaking in acetone, to form a fibrous film structure binding said particles of zirconia.

16. The process as defined in claim 1, said aqueous mixture containing about 50% to about 95% of said particles of an inorganic substance, and about 5% to about 50% of said particles of said organic polymer, by weight of total solids.

17. The process as defined in claim 1, said aqueous mixture containing about 70% to about 90% of said particles of said inorganic substance and about 10% to about 30% of said particles of said organic polymer, by weight of total solids.

18. A microporous flexible battery separator film consisting essentially of an organic polymer having particles of an inorganic substance uniformly distributed in said film, said film having high ionic conductivity, resistance to alkali electrolyte, high resistance to oxidation and good thermal stability, said film being produced by the process of claim 1.

19. A microporous flexible battery separator film consisting essentially of an organic polymer having particles of an inorganic substance uniformly distributed in said film, said film having high ionic conductivity, resistance to alkali electrolyte, high resistance to oxidation and good thermal stability, said film being produced by the process of claim 4.

20. A microporous flexible battery separator film consisting essentially of an organic polymer having particles of an inorganic substance uniformly distributed in said film, said film having high ionic conductivity, resistance to alkali electrolyte, high resistance to oxidation and good thermal stability, said film being produced by the process of claim 7.

21. A microporous flexible battery separator film consisting essentially of an organic polymer having particles of an inorganic substance uniformly distributed in said film, said film having high ionic conductivity, resistance to alkali electrolyte, high resistance to oxidation and good thermal stability, said film being produced by the process of claim 8.

22. A microporous flexible battery separator film consisting essentially of an organic polymer having particles of an inorganic substance uniformly distributed in said film, said film having high ionic conductivity, resistance to alkali electrolyte, high resistance to oxidation and good thermal stability, said fil mbeing produced by the process of claim 13.

23. A microporous flexible battery separator film consisting essentially of an organic polymer having particles of an inorganic substance uniformly distributed in said film, said film having high ionic conductivity, resistance to alkali electrolyte, high resistance to oxidation and good thermal stability, said film being produced by the process of claim 14.

24. A battery having a pair of electrodes of opposite polarity and a porous separator between said electrodes for retaining electrolyte and permitting transfer of electrolyte ions while inhibiting migration of electrode ions, said separator being a microporous flexible film as defined in claim 18.

25. A battery having a pair of electrodes of opposite polarity and a porous separator between said electrodes for retaining electrolyte and permitting transfer of electrolyte ions while inhibiting migration of electrode ions, said separator being a microporous flexible film as defined in claim 20.

26. A battery having a pair of electrodes of opposite polarity and a porous separator between said electrodes for retaining electrolyte and permitting transfer of electrolyte ions while inhibiting migration of electrode ions, said separator being a microporous flexible film as defined in claim 23.

27. A battery as defined in claim 26, wherein said electrodes are zinc and silver electrodes.

References Cited

UNITED STATES PATENTS

| Patent No. | Date | Inventor | Class |
|---|---|---|---|
| 3,364,077 | 1/1968 | Arrance et al. | 136—146 |
| 2,592,147 | 4/1952 | Ikeda | 260—29.6 F |
| 3,407,249 | 10/1968 | Landi | 136—86 R |
| 3,496,102 | 11/1967 | Dahl et al. | 210—31 |
| 3,554,814 | 1/1971 | Arrance et al. | 136—148 |
| 3,457,113 | 7/1969 | Deibert | 136—86 |
| 3,542,596 | 11/1970 | Arrance | 136—146 |

DONALD L. WALTON, Primary Examiner

U.S. Cl. X.R.

136—30, 146, 148; 264—126